(12) United States Patent
Adomeit et al.

(10) Patent No.: US 8,509,586 B2
(45) Date of Patent: Aug. 13, 2013

(54) TERMINAL BOX FOR FIBEROPTIC CABLES AND PANEL

(75) Inventors: Jörg Adomeit, Berlin (DE); Oliver Hartmann, Potsdam (DE); Ulrich Hetzer, Berlin (DE); Pia Kopf, Berlin (DE); Frank Mössner, Berlin (DE); Michael Sielaff, Berlin (DE)

(73) Assignee: ADC GmbH, Berlin (DE)

( * ) Notice: Subject to any disclaimer, the term of this patent is extended or adjusted under 35 U.S.C. 154(b) by 357 days.

(21) Appl. No.: 12/479,932

(22) Filed: Jun. 8, 2009

(65) Prior Publication Data
US 2009/0304342 A1   Dec. 10, 2009

(30) Foreign Application Priority Data
Jun. 9, 2008  (DE) .................. 10 2008 027 381

(51) Int. Cl.
*G02B 6/00* (2006.01)
(52) U.S. Cl.
USPC ........................................... 385/135; 385/134
(58) Field of Classification Search
USPC ......... 385/134–135, 147; 312/223.1; 211/26
See application file for complete search history.

(56) References Cited

U.S. PATENT DOCUMENTS

| | | | |
|---|---|---|---|
| 4,832,436 A | 5/1989 | Goto et al. | |
| 5,067,784 A * | 11/1991 | Debortoli et al. | 385/53 |
| 5,247,603 A | 9/1993 | Vidacovich et al. | |
| 5,285,515 A * | 2/1994 | Milanowski et al. | 385/135 |
| 5,363,466 A | 11/1994 | Milanowski et al. | |
| 5,567,178 A | 10/1996 | Grässer | |
| 5,668,911 A | 9/1997 | Debortoli | |
| 5,835,657 A | 11/1998 | Suarez et al. | |
| 5,987,207 A * | 11/1999 | Hoke | 385/135 |
| 6,226,434 B1 * | 5/2001 | Koshiyama et al. | 385/134 |
| 6,496,638 B1 * | 12/2002 | Andersen | 385/135 |
| 6,661,961 B1 * | 12/2003 | Allen et al. | 385/135 |
| 6,721,484 B1 * | 4/2004 | Blankenship et al. | 385/135 |
| 7,239,789 B2 * | 7/2007 | Grubish et al. | 385/135 |
| 7,340,144 B2 * | 3/2008 | Dobbins et al. | 385/135 |
| 7,376,325 B1 * | 5/2008 | Cloud et al. | 385/135 |
| 7,489,849 B2 * | 2/2009 | Reagan et al. | 385/135 |
| 7,493,003 B2 * | 2/2009 | Kowalczyk et al. | 385/135 |
| 7,522,805 B2 * | 4/2009 | Smith et al. | 385/135 |
| 7,961,999 B2 | 6/2011 | Fröhlich et al. | |
| 2004/0013389 A1 * | 1/2004 | Taylor | 385/134 |
| 2005/0175307 A1 * | 8/2005 | Battey et al. | 385/135 |

FOREIGN PATENT DOCUMENTS

| | | |
|---|---|---|
| DE | 3704560 | 8/1988 |
| DE | 41 19 829 | 12/1992 |
| DE | 19740246 | 2/1999 |
| DE | 202005009182 | 8/2005 |

(Continued)

*Primary Examiner* — Ellen Kim
(74) *Attorney, Agent, or Firm* — Merchant & Gould P.C.

(57) ABSTRACT

The invention relates to a terminal box (1) for fiberoptic cables, comprising an at least two-part housing with a lower part (3) and a cover (2), the cover (2) being arranged pivotably on the lower part (3), at least one receptacle for a splice, at least one feed (10) for a fiberoptic cable and a receptacle (11) for a coupling, the side faces (5, 6) of the cover (2) being longer than the end faces (7, 8) of the cover (2), a pivot bearing of the cover (2) being arranged on an end face (8) of the cover (2), and to a panel for accommodating a terminal box (1) for fiberoptic cables.

15 Claims, 10 Drawing Sheets

(56) References Cited

FOREIGN PATENT DOCUMENTS

| | | |
|---|---|---|
| EP | 0 557 187 | 8/1993 |
| EP | 0626599 | 11/1994 |
| EP | 0531628 B1 | 9/1996 |
| EP | 1 203 974 | 5/2002 |
| FR | 2 757 644 | 6/1998 |
| WO | WO 2008/017622 | 2/2008 |

* cited by examiner

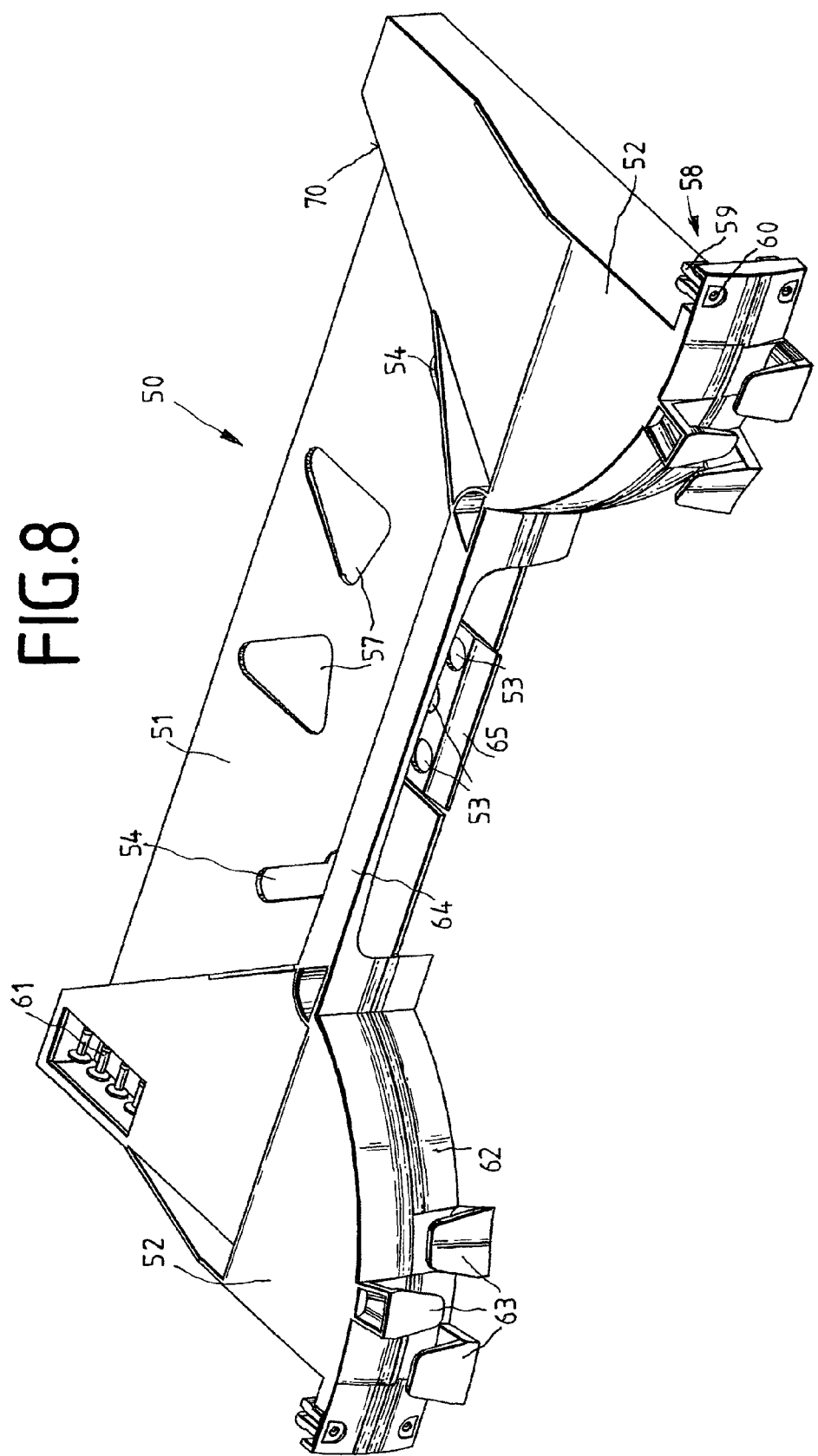

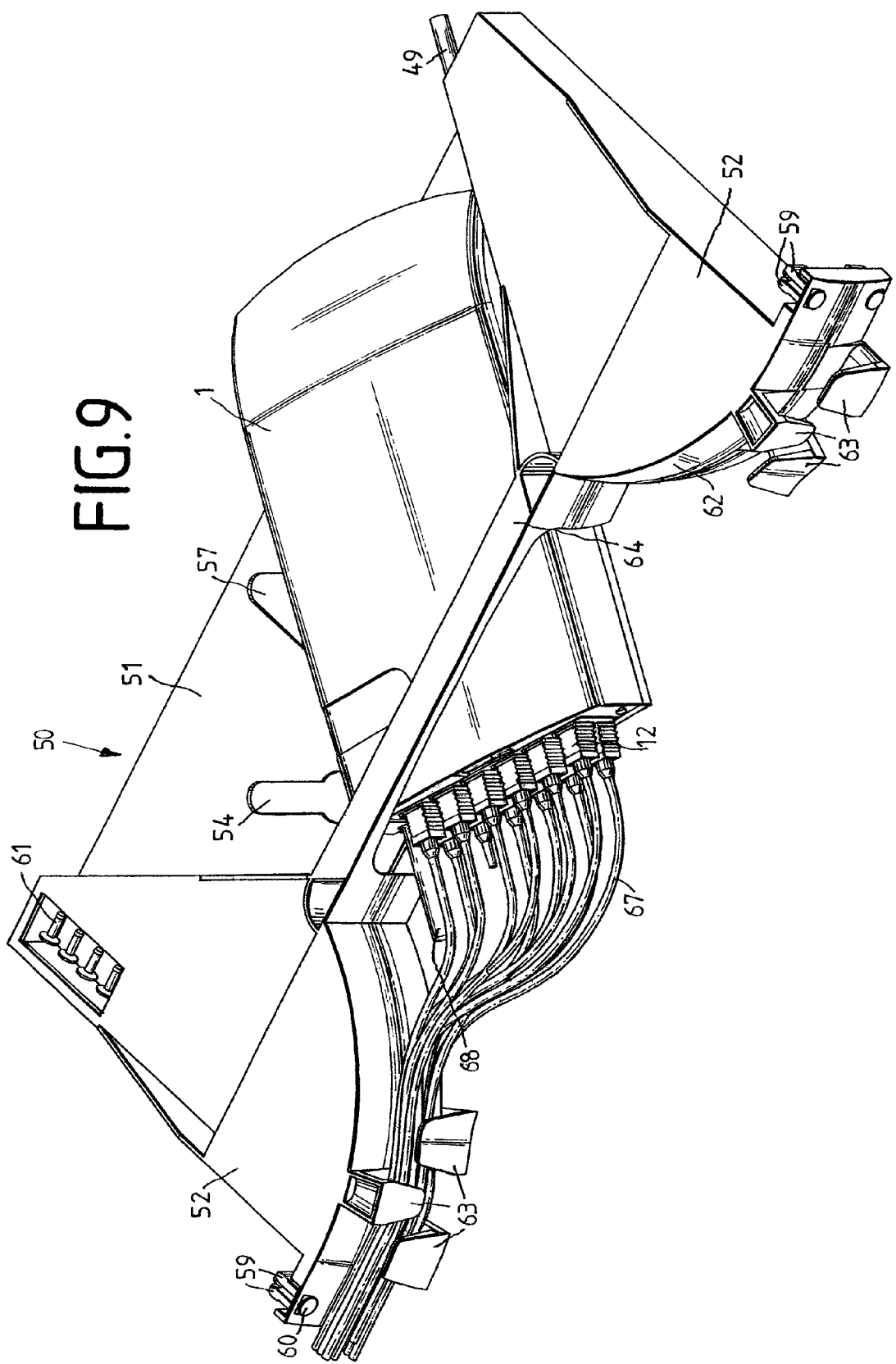

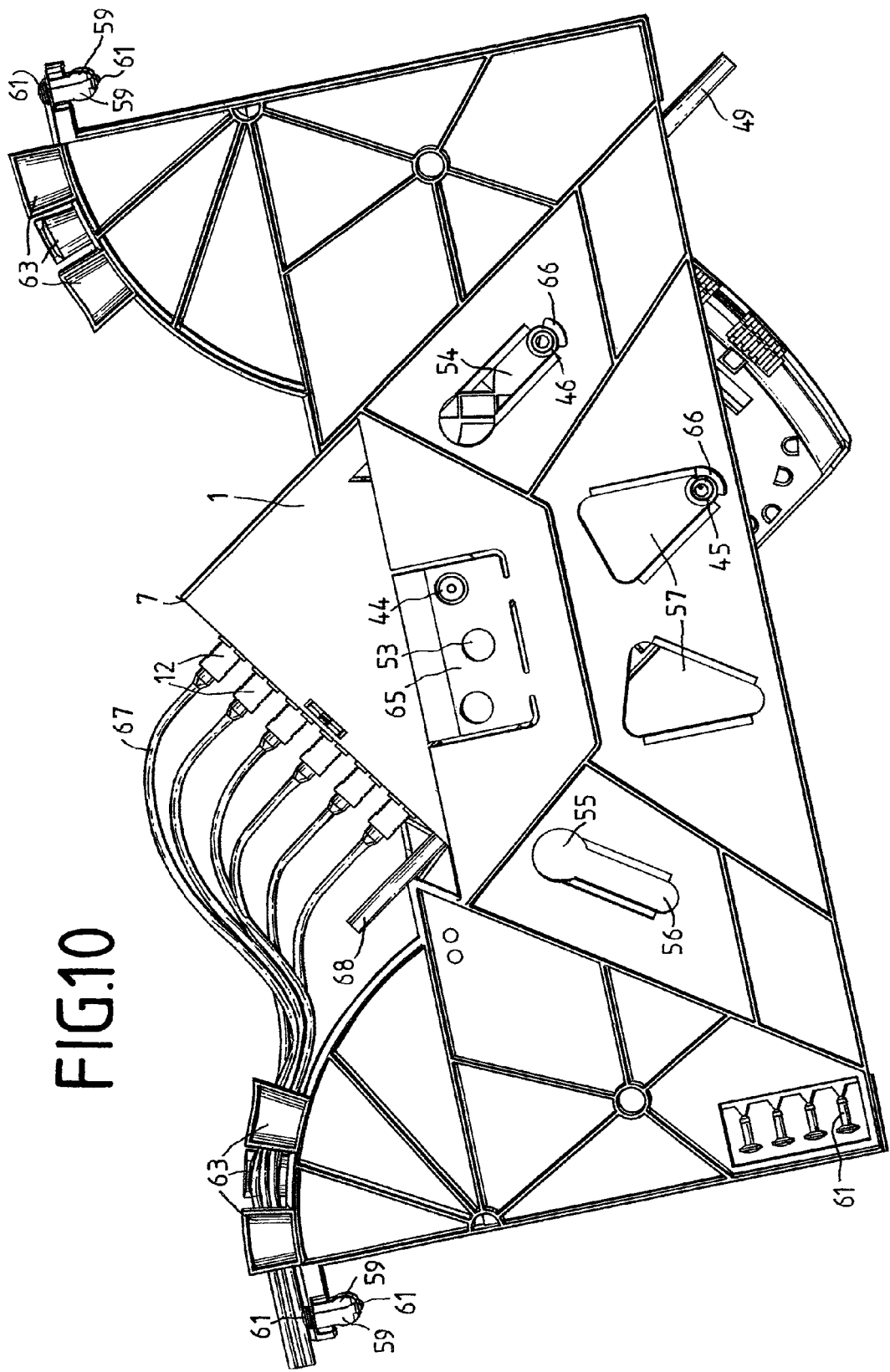

TERMINAL BOX FOR FIBEROPTIC CABLES AND PANEL

This application claims benefit of Serial No. 10 2008 027 381.3, filed 9 Jun. 2008 in Germany and which application is incorporated herein by reference. To the extent appropriate, a claim of priority is made to each of the above disclosed applications.

BACKGROUND OF THE INVENTION

The invention relates to a terminal box for fiberoptic cables and to a panel for accommodating a terminal box.

Such terminal boxes, also referred to as termination boxes, are used for connecting fiberoptic cables. For this purpose, for example, a fiberoptic cable with two fibers is spliced in each case with one pigtail, the plugs of the pigtails each being plugged into a coupling. Then, an external fiberoptic plug can be plugged via the other side of the coupling for tapping purposes.

The housings of such terminal boxes generally have a lower part and a cover, the cover being articulated pivotably on the lower part, the basic shape of the housings being rectangular and the side faces being longer than the end faces, the pivot bearing of the cover being arranged on one side face, so that the cover is swung open to the side.

Such terminal boxes are typically fastened on the wall, for which purpose the terminal boxes have, for example, openings in the lower part in order to screw in the terminal box. However, such terminal boxes do not have any fastening structure for fastening the terminal box on a 19" frame.

SUMMARY OF THE INVENTION

The invention is based on the technical problem of providing an improved terminal box for fiberoptic cables and of providing a panel, by means of which a terminal box can be used in a more flexible manner.

In this regard, the terminal box for fiberoptic cables comprises an at least two-part housing with a lower part and a cover, the cover being arranged pivotably on the lower part, at least one receptacle for a splice, at least one feed for a fiberoptic cable and a receptacle for a coupling, the side faces of the cover and the lower part being longer than their end faces, a pivot bearing of the cover being arranged on an end face, with the result that the cover is pivoted over the end face, i.e. upwards or downwards. This has the advantage over lateral pivoting of the cover that, when there is a plurality of adjacent terminal boxes, the pivoting operation and the subsequent connection work are not impeded. Preferably, the cover is pivoted upwards.

Preferably, the cover is designed to be rounded off towards the end face with the pivot bearing, with the result that the end face with the pivot bearing is flatter than the opposite end face.

In a further preferred embodiment, the feed for the fiberoptic cable is arranged laterally offset in the end face opposite the pivot bearing. Preferably, the receptacles for the couplings are arranged in the same end face, but arranged offset towards the other side, which means that incoming and outgoing optical fibers are physically separated from one another, which in turn facilitates the guidance of the fibers in the terminal box.

In a further preferred embodiment, a further feed for fiberoptic cables is in the side face adjacent to the feed. This can be realized in a relatively simple manner in technical terms since there is no pivot bearing to impede the feed.

In a further preferred embodiment, a feed for fiberoptic cables is in the lower side of the lower part.

In a further preferred embodiment, the cover in the pivoted-up state has a latching position, which prevents it from unintentionally being folded down.

In a further preferred embodiment, a pivotable carrier is arranged between the lower part and the cover and carries the receptacle or receptacles for the splices.

Preferably, the carrier in the pivoted-up state has a latching position. In principle, it is also possible for the carrier to be pivoted without a latching position with the cover and to be held in this latching position.

Preferably, the carrier is designed to be rounded off towards the pivot bearing of the cover, which in particular simplifies the guidance of the fibers and the connection to the pivot bearing.

In a further preferred embodiment, the receptacle for a splice has at least one web and two spring arms, the spring arms springing against the same side of the web.

Further preferably, at least two receptacles for splices are provided, each receptacle having at least one dedicated web and two spring arms, the adjacent spring arms of different receptacles being parallel to one another. This results in a compact design of the receptacles in comparison with arrangements where in each case at least one web is used for two receptacles. It should be mentioned here by way of explanation that a dedicated web means that the web is used exclusively by the receptacle.

The panel for accommodating a terminal box for fiberoptic cables comprises a carrier plate and two side parts, the carrier plate being formed with openings for accommodating fastening elements of a terminal box, the side parts having fastening structure for fastening the panel on a frame. This means that the terminal box which is usually designed for being fastened to a wall can be fastened on the panel and the panel can then be fastened on the frame. The frame is preferably in the form of a 19" rack. This makes it possible to considerably reduce warehousing costs since, by means of the panel, the terminal box can be arranged in a simple manner on a frame. The terminal box provided can therefore be used without any great complexity in a flexible manner for wall or frame fastening operations. Further preferably, the fastening elements of the terminal box are the fastening elements for the wall fastening. The panel is preferably in the form of an integral injection-molded part.

Preferably, the side parts are designed to be rounded off on the front side, with the result that the fiberoptic cables are guided by the terminal box whilst maintaining the bending radii. Preferably, further cable guides are therefore arranged on the front side of the side parts.

In a further preferred embodiment, the fastening structure for fastening the panel on a frame is in the form of a screwless latching connection. Further preferably, the latching connection is designed in such a way that it can be secured against becoming unlatched by means of a securing pin.

In a further preferred embodiment, the carrier plate has openings for accommodating the terminal box in various positions, preferably with three positions being provided. Further preferably, the terminal box has three fastening elements.

BRIEF DESCRIPTION OF THE DRAWINGS

The invention will be explained in more detail below with reference to a preferred exemplary embodiment. In the figures:

FIG. 8 shows a perspective front view of a panel for accommodating a terminal box, FIG. 9 shows a perspective front view of the panel with the terminal box accommodated, and FIG. 10 shows a perspective view from below of the panel shown in FIG. 9.

DETAILED DESCRIPTION

Figure 1:
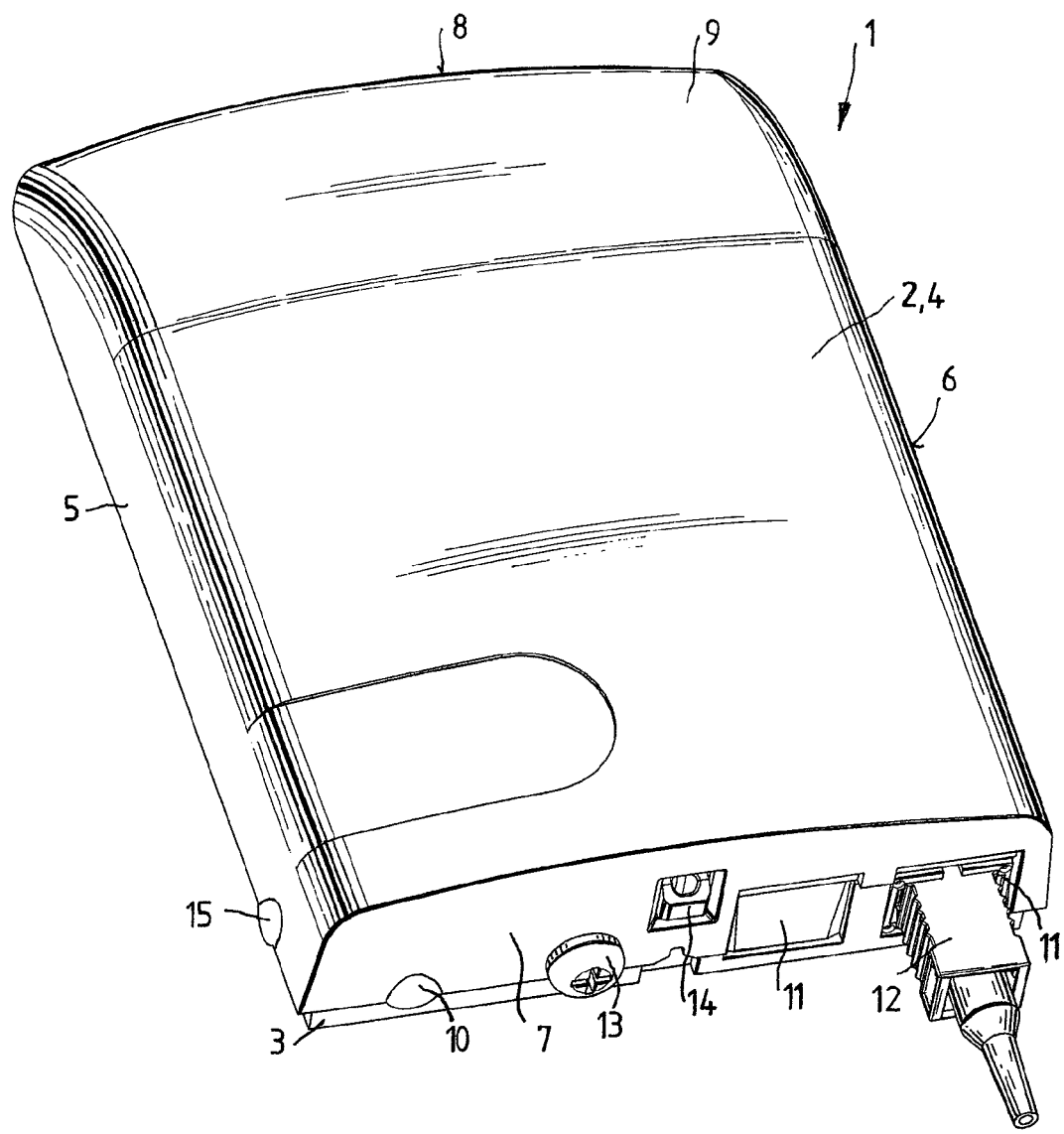
FIG. 1 shows a perspective front view of a terminal box.

FIG. 1 illustrates a terminal box 1 for fiberoptic cables. The terminal box 1 comprises a cover 2 and a lower part 3. The cover 2 has an upper side 4, two side faces 5, 6 and two end faces 7, 8. In this case, the side faces 5, 6 are longer than the end faces 7, 8. The upper side 4 has a rounded-off region 9, with the result that the upper side 4 curves in the direction of the end face 8 towards the lower part 3, and the end face 8 has only a very low height in comparison with the end face 7. The side faces 5, 6 also taper in a corresponding manner in the direction of the end face 8. The end face 7 has a feed 10 for fiberoptic cables which is arranged such that it is laterally offset and is in a relatively deep position. On the other side, two receptacles 11 for couplings for fiberoptic plugs 12 are arranged, a fiberoptic plug having been inserted into the right-hand receptacle 11 in the illustration. Also illustrated is a securing screw 13 and a loop 14 for accommodating a lead seal. A further feed 15 for fiberoptic cables is provided on the side face 5.

Figure 2:
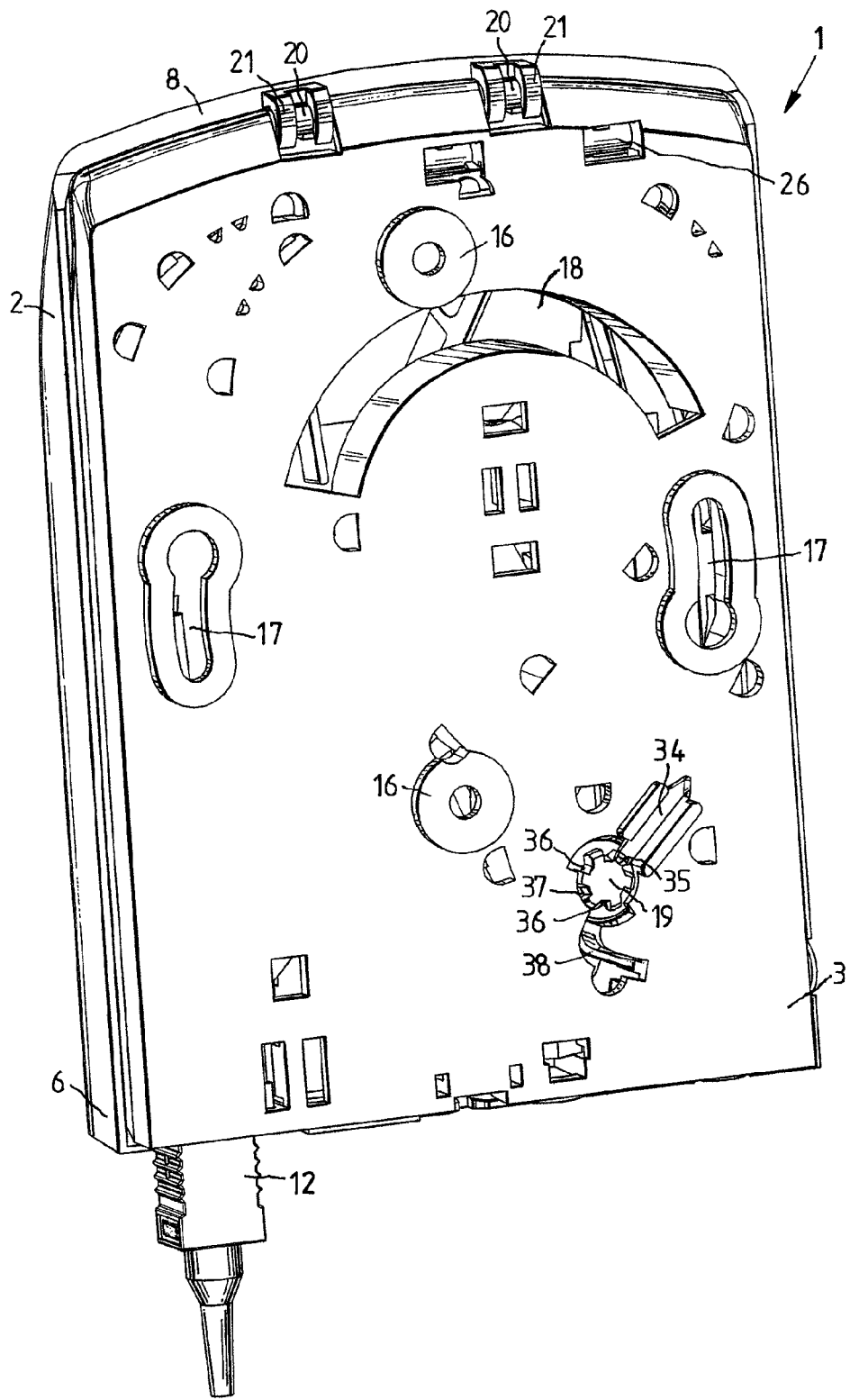
FIG. 2 shows a perspective view from below of the terminal box.

FIG. 2 illustrates a view from below of the terminal box 1. The lower part 3 has openings 16 for fasteners for fitting it to the wall and openings 17 for fitting it onto a flush-mounted box. Furthermore, the lower part has a further feed 18 for a fiberoptic cable from the wall. Furthermore, a strain relief apparatus 19 is shown which will be explained in more detail below. The lower part 3 has a cylinder pin 20 in the region of the end face 8 of the cover 2, two hinge elements 21 being clamped onto said cylinder pin and being arranged on the cover 2. The hinge elements 21 and the cylinder pin 20 form a pivot bearing for the cover 2, the hinge elements 21 and the cylinder pin 20 being designed in such a way that they latch in in a specific angular position. Preferably, this angle is greater than 90° and less than 180°. Furthermore, the lower part 3 has a further spindle 26, which is part of a pivot bearing of a carrier which will be explained in more detail further below.

Figure 3:
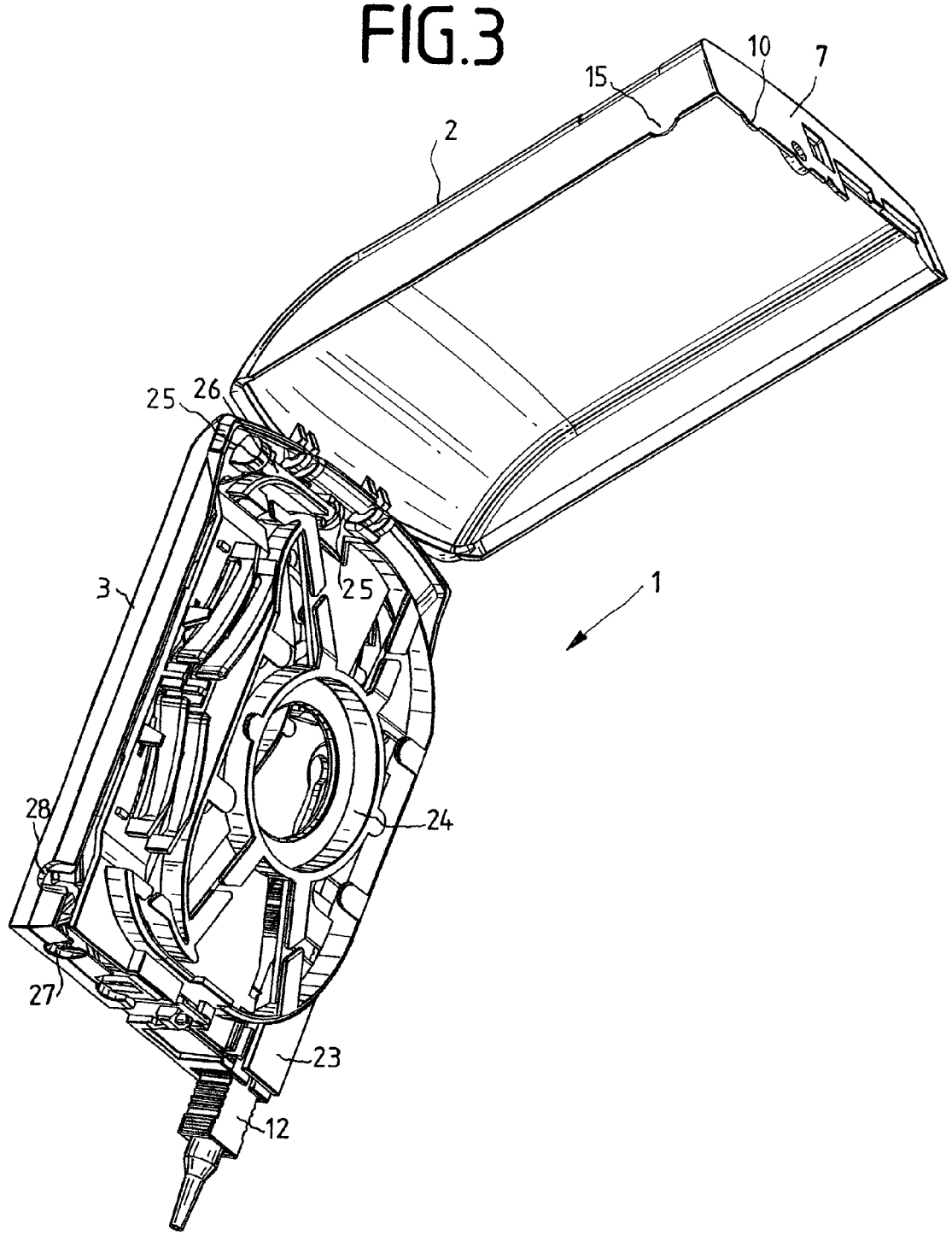
FIG. 3 shows a perspective side view of the terminal box with the cover pivoted up.

FIG. 3 illustrates the terminal box 1 with the cover 2 pivoted up in the latching position. A carrier 23, which comprises a winding cylinder 24 for excess lengths of fiberoptic cores and two receptacles for splices, is arranged on the lower part 3, the design of the receptacles being explained in more detail further below in connection with FIG. 5. The carrier 23 is connected via two hinge elements 25 to the spindle 26 of the lower part 3, the hinge elements 25 and the spindle 26 forming a pivot bearing. The hinge elements 25 and/or the spindle 26 are in this case again designed in such a way that they form a latching position when pivoted. The carrier 23 is in this case designed to be rounded off, so that the installation height of the carrier 23 decreases towards the spindle 26. The lower part 3 furthermore has an opening 27 and an opening 28, which are aligned with respect to the feeds 10 and 15, respectively.

Figure 4:
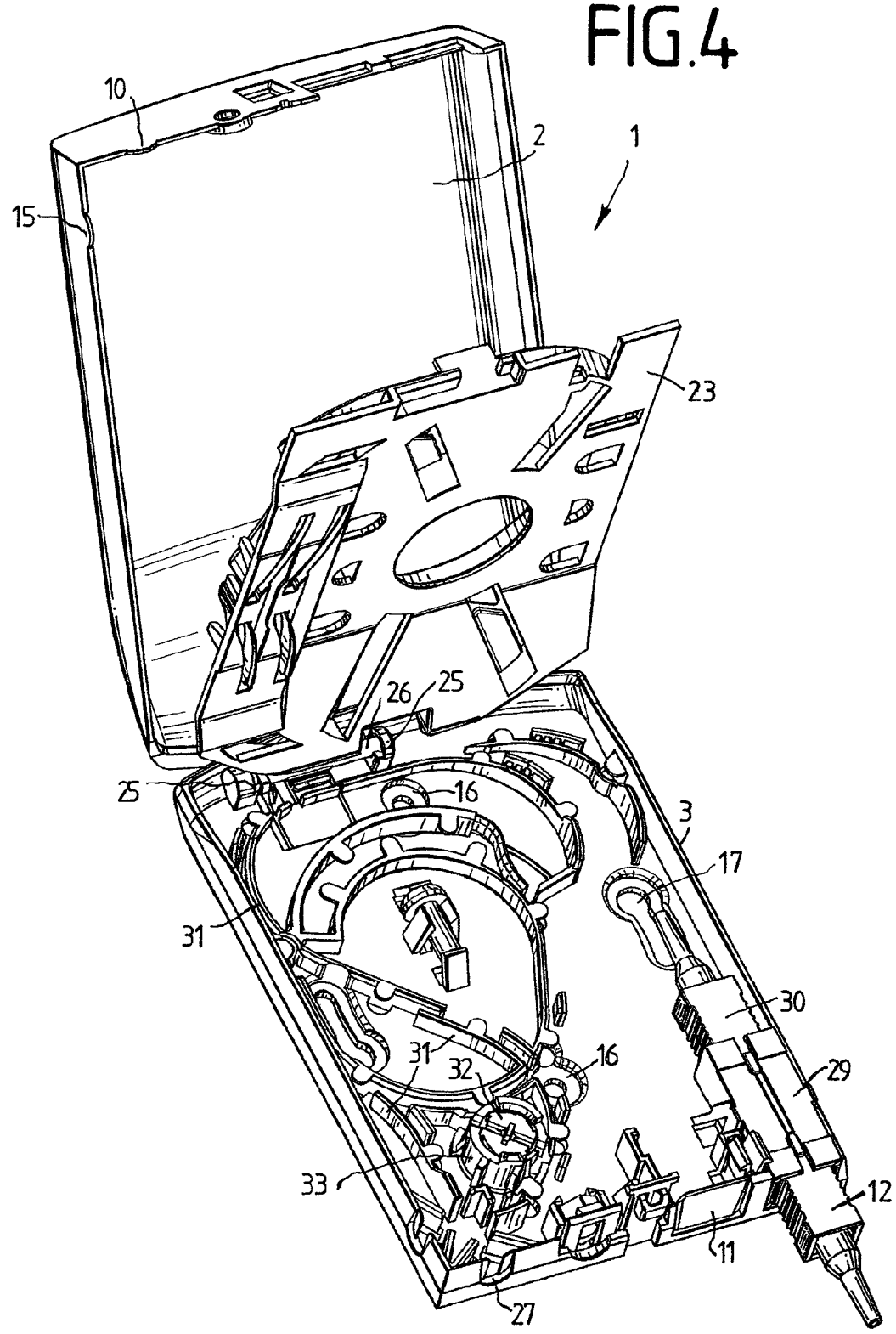
FIG. 4 shows a perspective front view with the cover pivoted up and the carrier.

FIG. 4 finally illustrates the terminal box 1 with the carrier 23 pivoted up, in this case the angle for the latching position being less than the angle for the latching position of the cover 2. The angle for the latching position of the carrier 23 is approximately 90°. In the lower part 3, an empty receptacle 11 for a coupling is illustrated and a receptacle 11 with a coupling 29 with a fiberoptic plug 12 and a plug 30 of a pigtail which is not illustrated in any more detail. Furthermore, various guides 31 are illustrated, via which a fiberoptic cable, which has been guided beforehand into the lower part 3 via the feeds 10 and 15, can be guided in the direction of the spindle 26 and from there upwards towards the carrier 23, where the reserve length is wound onto the winding cylinder 24 and the optical fiber is finally spliced with a pigtail. The strain relief apparatus 19 is used for fastening Kevlar fibers of the supplied fiberoptic cables. The strain relief apparatus 19 in this case comprises an inner part 32 and an outer part 33, the inner part 32 being mounted rotatably in the outer part. The inner part 32 has a slot, under which a cylindrical bore runs parallel, the slot and the bore being connected to one another, i.e. the bore being open in the region of the slot. The strain relief apparatus 19 furthermore has a latching device in order to latch the inner and outer parts 32, 33 to one another after rotation in order to prevent them from automatically rotating back. This latching device is illustrated in FIG. 2, namely a latching arm 34 with the latching tab 35 and latching tabs 36, between which latching receptacles 37 are formed, into which the latching tab 35 then engages. The latching tabs 36 and the latching receptacles 37 are in this case arranged on the lower side of the inner part 32. There is also a fixing device 38 in the form of a sprung arm, which presses the Kevlar fibers against a winding region of the inner part 32. The Kevlar fibers are then inserted into the slot and pressed downwards into the bore. Subsequently, the inner part 32 is rotated, so that the Kevlar fibers are wound around a winding region of the inner part. The cable is in this case fixed on a stop, with the result that it is subject to self-locking. The stop is in this case preferably formed by two faces, between which the core of the cable is guided through, the sheath of the cable stopping against the stop.

Figure 5:
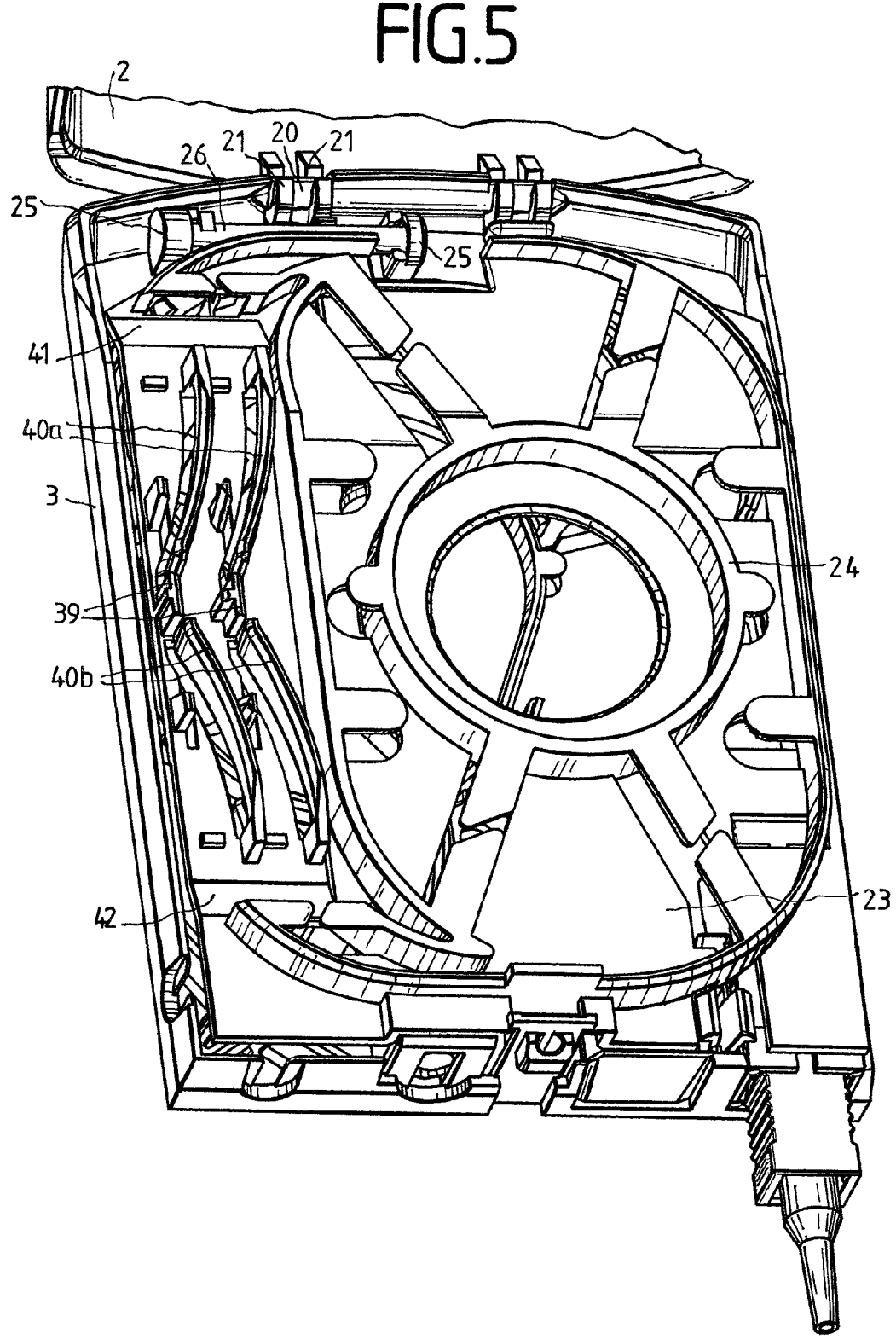
FIG. 5 shows a perspective plan view of the carrier.

FIG. 5 illustrates the carrier 23 in the folded-down state. The carrier 23 has two receptacles for splices, each receptacle having at least one web 39 and two spring arms 40a, b. In this case, the right-hand web 39 is in the form of a T in order to increase stability. The spring arms 40a, b are connected to wall elements 41, 42 of the carrier 23. The spring arms 40a of different receptacles are parallel to one another. Likewise, the spring arms 40b are parallel to one another. The web 39 of the right-hand receptacle in this case is preferably in the same line as the connection of the spring arms 40a, b of the left-hand receptacle to the wall elements 41, 42. This allows for a very compact design of the receptacles. The actual splice is fixedly clamped between the web 39 and the two spring arms 40a, b. In order to facilitate insertion of the splices, the web 39 is designed to be not as high as the spring arms 40a, b. In the example illustrated, the spring arms 40a, b are designed to be straight. In particular when using very small splices, however, it may be advantageous to design the spring arms 40a, b to be curved. This reduces the risk of the splices sliding through the cut-free portions of the spring arms 40a, b, the adjacent spring arms 40a, b being curved parallel to one another.

Figure 6:
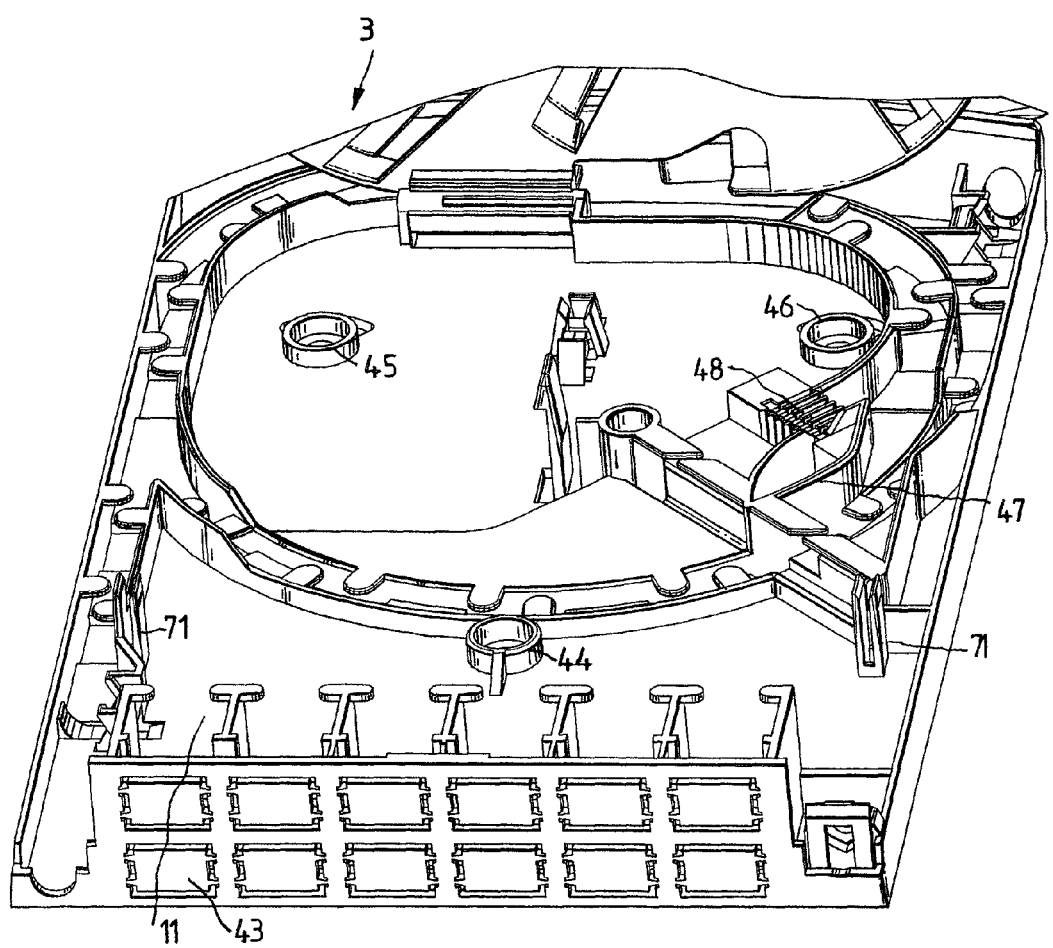
FIG. 6 shows a perspective plan view of a lower part in an alternative embodiment.

FIG. 6 illustrates an alternative embodiment of the lower part 3, which has twelve receptacles 11 for couplings, these receptacles being arranged in pairs one above the other. Furthermore, the lower part 3 has coverings 43, which are formed with desired breaking points and protect unused receptacles 11. Furthermore, the lower part has two holding elements 71, in which the carrier 23 is fixed. Furthermore, fastening elements 44, 45, 46 for fastening to the wall are provided which are formed with openings 16. In addition, the lower part 3 is formed with a guide element 47 and a fixing element 48. As a result, both cores and fibers can be guided in the lower part 3. In this case, cores are guided past the guide element 47 on the right, with fibers being guided past on the left and being clamped in the fixing element 48 in order then to be guided on.

Figure 7:
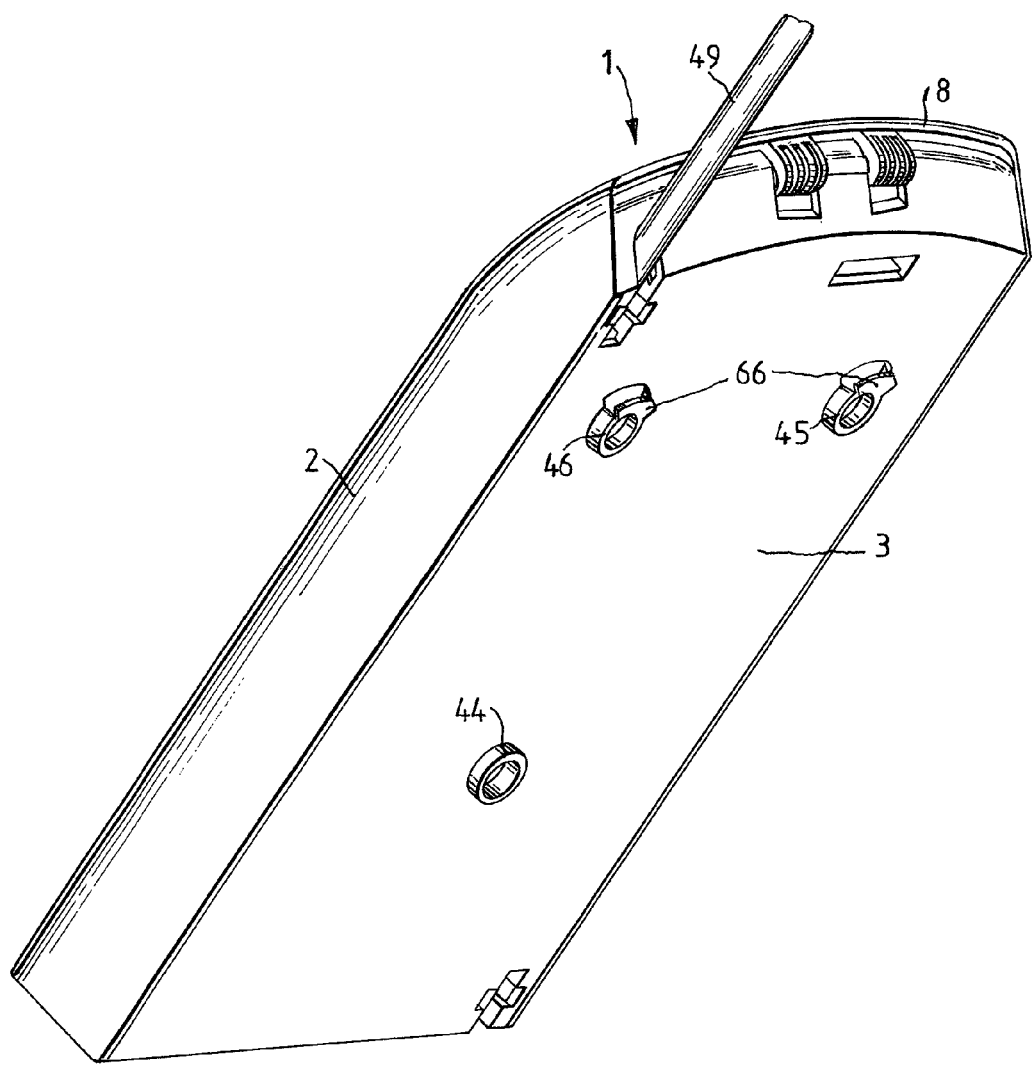
FIG. 7 shows a perspective view from below of a terminal box with a lower part as shown in FIG. 6.

FIG. 7 illustrates the terminal box 1 with the lower part 3 in simplified form, a few of the openings and cut-free portions not being illustrated. Furthermore, a fiberoptic cable 49 is shown, which is guided from the end face 8 into the terminal box 1. The fastening elements 45, 46 are in this case formed with lugs 66.

FIG. 8 illustrates a panel 50 for a terminal box 1. The panel 50 comprises a carrier plate 51 and two side parts 52. The carrier plate 51 comprises a sprung lug 65 with three openings 53, the central opening 53 being arranged so as to be slightly offset towards the rear. Furthermore, the carrier plate 51 has two openings 54, which each have a circular part 55 with an extension 56, the extensions 56 each running at an angle rearwards with respect to the side parts 52 (see FIG. 10). Finally, the carrier plate 51 has two triangular openings 57, whose corners are rounded off. A fastening device 58 for latching on a frame is arranged on the side parts 52. The fastening device 58 comprises two lugs 59, which need to be pressed towards one another for unlatching purposes. In order to prevent unintentional unlatching, bores 60 are provided, into which in each case one securing pin 61 can be plugged, which securing pin prevents the lugs from being pressed together. The securing pins 61 are injection-molded together with the panel 50 and later broken away. The side parts 52 have further rounded-off portions 62 with cable or core guides 63. A web 64 runs parallel to the carrier plate 51 between the two side parts 52.

FIG. 9 illustrates the panel 50 with the terminal box 1 installed. For this purpose, the terminal box 1 is pushed under the web 64 and the fastening element 45 is pressed into the right-hand opening 57 and the fastening element 46 is pressed into the right-hand opening 54. Then, the terminal box 1 is pushed towards the rear along the edge 70, with the result that lugs 66 of the fastening elements 45, 46 are pushed over the carrier plate 51. After this, the fastening element 44 is then pressed into the opening 53. As a result, the terminal box 1 is fastened securely on the carrier plate 51, the end state of the fastening elements being shown best in FIG. 10. If the terminal box 1 is intended to be arranged in a central position, the two fastening elements 45, 46 are inserted into the two openings 57 and pushed towards the rear, the fastening element 44 then being pressed into the central opening 53. Finally, the terminal box 1 can also be arranged in a third position on the left-hand side part, in which case the fastening takes place in mirror-inverted fashion with respect to the fastening illustrated in FIG. 10. The fastening via three fastening elements 44, 45, 46 in this case has the advantages of a three-point bearing arrangement. The sprung lug 65 is cut free at the side edges and partially in the rear region, with the result that a sufficient spring effect is set, the rear connection to the carrier plate 51 being maintained by two connecting webs in order to ensure sufficient stability of the lug. FIGS. 9 and 10 also show how fiberoptic plugs 12 are plugged into the couplings of the terminal box 1, the fiberoptic cables 67 of the fiberoptic plugs 12 being guided in the cable guides 63 along the rounded-off portion 62. Furthermore, FIGS. 9 and 10 illustrate a further fiberoptic cable 68, which is fed from the front side 7 of the terminal box 1.

| List of reference symbols | |
|---|---|
| 1 | Terminal box |
| 2 | Cover |
| 3 | Lower part |
| 4 | Upper side |
| 5, 6 | Side faces |
| 7, 8 | End faces |
| 9 | Rounded-off region |
| 10 | Feed |
| 11 | Receptacles |
| 12 | Fiberoptic plug |
| 13 | Securing screw |
| 14 | Loop |
| 15 | Feed |
| 16 | Openings |
| 17 | Openings |
| 18 | Feed |
| 19 | Strain relief apparatus |
| 20 | Cylinder pin |
| 21 | Hinge elements |
| 23 | Carrier |
| 24 | Winding cylinder |
| 25 | Hinge elements |
| 26 | Spindle |
| 27 | Opening |
| 28 | Opening |
| 29 | Coupling |
| 30 | Plug |
| 31 | Guides |
| 32 | Inner part |
| 33 | Outer part |
| 34 | Latching arm |
| 35 | Latching tab |
| 36 | Latching tabs |
| 37 | Latching receptacles |
| 38 | Fixing device |
| 39 | Web |
| 40a, b | Spring arms |
| 41, 42 | Wall elements |
| 43 | Coverings |
| 44, 45, 46 | Fastening elements |
| 47 | Guide element |
| 48 | Fixing element |
| 49 | Fiberoptic cable |
| 50 | Panel |
| 51 | Carrier plate |
| 52 | Side parts |
| 53, 54 | Openings |
| 55 | Circular part |
| 56 | Extension |
| 57 | Openings |
| 58 | Fastening device |
| 59 | Lugs |
| 60 | Bores |
| 61 | Securing pin |
| 62 | Rounded-off portions |
| 63 | Core guides |
| 64 | Web |
| 65 | Lug |
| 66 | Lug |
| 67, 68 | Fiberoptic cable |
| 70 | Edge |
| 71 | Holding element |

The invention claimed is:

1. A terminal box for fiberoptic cables comprising:
an at least two-part housing with a lower part and a cover, the cover being arranged pivotably on the lower part, at least a first receptacle for a splice, at least one feed for a fiberoptic cable, and a second receptacle for coupling together two optical fibers, the side faces of the cover being longer than the end faces of the cover, wherein a pivot bearing of the cover is arranged on an end face of the cover;
wherein the housing is mounted to a panel including a carrier plate, the carrier plate defining a plurality of openings, wherein the housing is mountable to the panel in any of three positions based on which of the openings receives fastening elements extending from the housing.

2. The terminal box as claimed in claim 1, wherein the cover is rounded off towards the end face on which the pivot bearing is arranged, so that the end face on which the pivot bearing is arranged is shorter than the opposite end face.

3. The terminal box as claimed in claim 1, wherein the feed for the fiberoptic cable is arranged laterally offset from a longitudinal axis of the housing and in the end face opposite the pivot bearing.

4. The terminal box as claimed in claim 3, wherein a further feed for fiberoptic cables is in the side face adjacent to the at least one feed.

5. The terminal box as claimed in claim 1, wherein a feed for fiberoptic cables is defined through a lower side of the housing.

6. The terminal box as claimed in claim 1, wherein the cover latches in a pivoted-up position relative to the lower part.

7. The terminal box as claimed in claim 1, wherein a pivotable carrier is arranged between the lower part and the cover and carries at least one splice receptacle.

8. The terminal box as claimed in claim 7, wherein the carrier latches in a pivoted-up position.

9. The terminal box as claimed in claim 7, wherein the carrier is rounded off towards the pivot bearing of the cover.

10. The terminal box as claimed in claim 1, wherein the splice receptacle has at least one web and two spring arms, the spring arms springing against the same side of the web or webs.

11. The terminal box as claimed in claim 10, wherein at least two splice receptacles are provided, each splice receptacle having at least one dedicated web and two spring arms, the adjacent spring arms of different splice receptacles being parallel to one another.

12. The terminal box as claimed in claim 1, wherein two of the openings have a generally triangular shape.

13. The terminal box as claimed in claim 1, wherein four of the openings are rearwardly offset from three of the openings.

14. The terminal box as claimed in claim 1, wherein the panel also includes side parts coupled to the carrier plate, the side parts being configured to attach the panel to a frame.

15. The terminal box as claimed in claim 14, wherein front sides of the side parts are rounded.

* * * * *